United States Patent [19]

Ito et al.

[11] Patent Number: 5,015,443

[45] Date of Patent: * May 14, 1991

[54] METHOD OF AND APPARATUS FOR TREATING WASTE GAS BY IRRADIATION WITH ELECTRON BEAM

[75] Inventors: Kanichi Ito; Akihiko Maezawa, both of Yokohama, Japan

[73] Assignee: Ebara Corporation, Tokyo, Japan

[*] Notice: The portion of the term of this patent subsequent to Apr. 10, 2007 has been disclaimed.

[21] Appl. No.: 265,453

[22] PCT Filed: Apr. 23, 1987

[86] PCT No.: PCT/JP87/00259

§ 371 Date: Sep. 26, 1988

§ 102(e) Date: Sep. 26, 1988

[87] PCT Pub. No.: WO87/06494

PCT Pub. Date: Nov. 5, 1987

[30] Foreign Application Priority Data

Apr. 24, 1986 [JP] Japan ................... 61-95666

[51] Int. Cl.$^5$ ................... B01J 19/08; B01J 19/12; A21K 27/02

[52] U.S. Cl. ................... 422/186; 204/157.3; 204/157.46; 204/157.49; 250/435; 250/492.3; 422/904

[58] Field of Search ............ 204/157.22, 157.61, 204/157.63, 157.64, 157.41, 157.44, 157.46, 157.49, 157.5, 157.3; 252/626, 647; 422/186, 904; 250/435, 492.3

[56] References Cited

U.S. PATENT DOCUMENTS

| | | |
|---|---|---|
| 3,869,362 | 3/1975 | Machi et al. ............ 204/157.44 |
| 3,981,815 | 9/1976 | Taniguchi et al. ....... 204/157.46 |
| 3,997,415 | 12/1976 | Machi et al. ............ 204/157.46 |
| 4,097,349 | 6/1978 | Zenty ..................... 204/157.46 |
| 4,110,183 | 8/1978 | Furuta et al. ........... 204/157.41 |
| 4,175,016 | 11/1979 | Lewis et al. ............ 204/157.44 |
| 4,294,674 | 10/1981 | Aoki et al. ............. 204/157.1 H |
| 4,372,832 | 2/1983 | Bush ..................... 204/157.44 |
| 4,406,762 | 9/1983 | Ray et al. ............... 204/157.41 |
| 4,435,260 | 3/1984 | Koichi et al. ........... 204/164 |
| 4,595,579 | 6/1986 | Prudhon et al. ........ 204/157.41 |
| 4,702,808 | 10/1987 | Lemelson ............... 204/157.41 |

FOREIGN PATENT DOCUMENTS

| | | |
|---|---|---|
| 3608291 | 4/1987 | Fed. Rep. of Germany . |
| 3622621 | 1/1988 | Fed. Rep. of Germany . |
| 4996975 | 9/1974 | Japan . |
| 518636 | 3/1976 | Japan . |
| 5597232 | 7/1980 | Japan . |
| 5772312 | 1/1982 | Japan . |
| 6168126 | 4/1986 | Japan . |
| 8706494 | 11/1987 | World Int. Prop. O. . |

OTHER PUBLICATIONS

Translation of Japense Patent No. 51-8636.

Primary Examiner—Howard J. Locker
Attorney, Agent, or Firm—Oblon, Spivak, McClelland, Maier & Neustadt

[57] ABSTRACT

A method of and apparatus for treating waste gas by irradiation with electron beams wherein an electron beam irradiation chamber for irradiation with electron beams from an electron beam accelerator is provided in the vicinity of a main dust for waste gas; a part of the waste gas to be treated is introduced into the electron beam irradiation chamber where the waste gas is irradiated with electron beams to thereby form active species such as O and OH radicals; the waste gas having the active species formed therein is fed into the waste gas main duct by means of a feeding device; the waste gas fed into the waste gas main duct is dispersed into and mixed with the waste gas flowing through the main duct by means of a dispersing device, thereby changing noxious (gas) ingredients in the waste gas into the form of a mist or dust or the action of the active species; and the mist or dust is captured by means of a capturing device, for example, a dust collector.

2 Claims, 3 Drawing Sheets

METHOD OF AND APPARATUS FOR TREATING WASTE GAS BY IRRADIATION WITH ELECTRON BEAM

TECHNICAL FIELD

The present invention relates to a method of and apparatus for treating waste gas wherein waste gas containing noxious (gas) ingredients such as $SO_2$ and $NO_x$ is irradiated with electron beams to change the noxious (gas) ingredients into the form of mist (sulfuric acid and/or nitric acid) or dust (ammonium sulfate and/or ammonium nitrate) and the resulting mist or dust is then captured with a dust collector or the like.

BACKGROUND ART

One method of waste gas treatment whereby noxious (gas) ingredients such as $SO_2$ and $NO_x$ are removed from waste gases is a method wherein waste gas is irradiated with electron beams to form various active species such as O and OH radicals from oxygen, water, etc. in the waste gas so that the active species act on the noxious (gas) ingredients in the waste gas such as to form mist and this mist is further changed into dust in the presence of ammonia or the like, the mist and dust then being captured with a dust collector or the like.

FIG. 1 schematically shows the structure of an electron beam irradiation portion of a waste gas treatment apparatus for carrying out this waste gas treatment method. As illustrated, a waste gas duct 1 is provided with irradiation windows 2, and waste gas passing through the waste gas duct 1 is directly irradiated with electron beams 4 emitted from electron beam accelerators 3 through the irradiation window 2. In the structure wherein the electron beams 4 are directly applied to the inside of the waste gas duct 1, when the amount of waste gas increases to that which would be treated in a practical application and the size of the waste gas duct 1 increases correspondingly, it has heretofore been necessary, in order to allow all of the waste gas to absorb the electron beams 4, to dispose a multiplicity of electron beam accelerators 3 (two in the illustrated example) at the outer periphery of the waste gas duct 1 and also to increase the maximum range of the electron beams 4, as shown by the chain lines 5. However, disposition of a multiplicity of electron beam accelerators 3 involves disadvantage in that the structure of the waste gas treating apparatus becomes complicated and costs are raised. Further, in order to increase the maximum range of the electron beams 4, it is necessary to raise the acceleration voltage for electron beams, which leads to a substantial rise in the cost of the electron beam accelerators 3. In addition, if electron beams are accelerated at high voltages, high-energy X-rays are generated and a thick concrete wall or the like must be provided in order to provide shielding from such high-energy X-rays, which results in a rise in the overall cost of the waste gas treatment apparatus. Thus, the prior art suffers from various problems.

It should be noted that there are techniques which aim to have all of the waste gas irradiated with electron beams at a uniform dose, including those disclosed in the specifications of Japanese Patent Public Disclosure Nos. 49-096975 and 55-097232 and U.S. Pat. Nos. 4,507,265 and 4,596,642, but none of them completely solves the above-described problems.

Further, there is a technique disclosed in the specification of Japanese Patent Public Disclosure No. 61-68126 wherein atmospheric air is introduced into an electron beam irradiation reactor to allow said air to be irradiated with electron beams to thereby form ozone and oxygen atoms therein. Said air having ozone and oxygen atoms is mixed with a waste gas to oxidize NO in the waste gas to form $NO_2$ and then the waste gas is introduced to a wet absorption tower to effect desulfurization and denitration.

In the desulfurization and denitration of that technique, since a wet absorption tower is used the absorbing solution used in the wet absorption tower contains a large amount of nitrogen and sulfur compounds which are difficult to treat and costly waste water disposal equipment is therefore needed to treat the absorbing solution. This leads to the problem of high costs in the installation and maintenance thereof.

The present invention is directed to solution of the above-described problems of the prior art and it is an object of the present invention to provide a method of and apparatus for treating waste gas by irradiation with electron beams, wherein a part of the waste gas taken from the main stream of waste gas is irradiated with electron beams using a low-voltage type accelerator to form active species such as O and OH radicals in the irradiated waste gas and to thereby activate it, the activated waste gas then being uniformly fed into the main stream of waste gas and thereby effectively removing noxious gas ingredients such as $SO_2$ and $NO_x$ from the waste gas.

DISCLOSURE OF INVENTION

To attain the above-described object, the present invention provides a waste gas treatment method which comprises: irradiating a part of the waste gas which is the object of treatment with electron beams to form active species such as O and OH radicals in the irradiated waste gas; mixing the waste gas having the active species formed therein with the waste gas which is the object of treatment, thereby changing the noxious (gas) ingredients in the waste gas to be treated into the form of a mist or dust by the action of the active species; and capturing the mist or dust.

The present invention also provides a waste gas treatment apparatus which comprises: an electron beam irradiation chamber for irradiation with electron beams from an electron beam accelerator; a feeding device which introduces a part of the waste gas to be treated into the electron beam irradiation chamber where the waste gas is irradiated with electron beams to thereby form active species such as O and OH radicals, and which feeds the waste gas having the active species formed therein to a waste gas main duct through which the waste gas to be treated is flowing; a dispersing device for uniformly dispersing in the waste gas main duct the waste gas fed thereinto from the feeding device; and a capturing device for capturing noxious (gas) ingredients in the waste gas within the main duct which have been changed into the form of a mist of dust by the action of the active species.

BEST MODE FOR CARRYING OUT THE INVENTION

Modes for carrying out the present invention will be described hereinunder with reference to the drawings.

Figure 1:
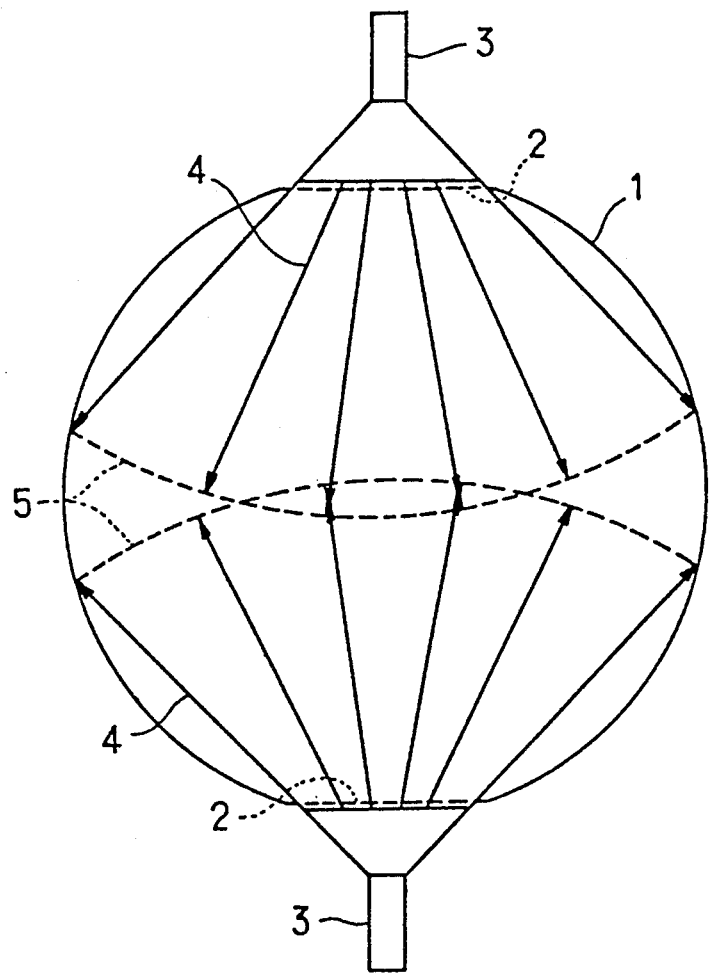
FIG. 1 schematically shows the structure of an electron beam irradiation portion of a conventional waste gas treatment apparatus.
Figure 2:
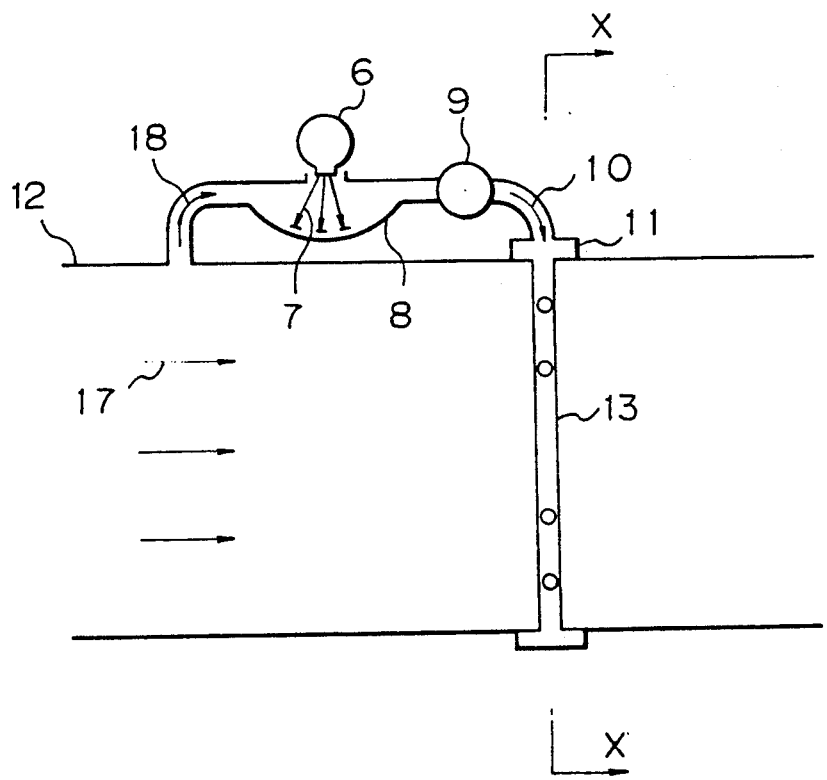
FIG. 2 schematically shows the structure of a waste gas treatment apparatus for carrying out the waste gas treatment method according to the present invention.
Figure 3:
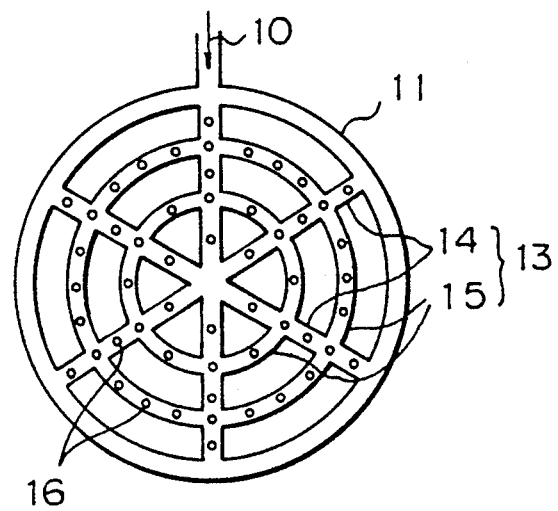
FIG. 3 is a sectional view taken along the line X—X of FIG. 2.

FIG. 2 schematically shows the structure of a waste gas treatment apparatus for carrying out the waste gas treatment method according to the present invention, while FIG. 3 is a sectional view taken along the line X—X of FIG. 2.

An electron beam irradiation chamber 8 for irradiation with electron beams 7 from an electron beam accelerator 6 is disposed in the vicinity of a waste gas main duct 12 through which waste gas 17 flows. The distance from the electron beam irradiation opening of the electron beam accelerator 6 to the wall surface of the electron beam irradiation chamber 8 is set so as to be slightly greater than the maximum range of the electron beams 7. One end of the electron beam irradiation chamber 8 communicates with a waste gas main duct 12 allowing waste gas 18 to enter irradiation chamber 8, while the other end thereof is communicated with a dispersing device 13 set within the main duct 12 through a suction transfer blower 9 and a pipe line 10. The dispersing device 13 comprises a plurality of radial tubes 14 disposed so as to extend radially from the central portion of the main duct 12 and concentric tubes 15 disposed concentrically, the radial tubes 14 and the concentric tubes 15 communicating with each other and also communicating with the pipe line 10. Each of the radial and concentric tubes 14 and 15 has a multiplicity of small bores 16 so formed as to face downstream of the flow of waste gas 17. It should be noted that the suction transfer blower 9 and the pipe line 10 constitute in combination a feeding device for feeding waste gas 18 from the electron beam irradiation chamber 8 to the dispersing device 13.

By virtue of the above-described arrangement of the waste gas treatment apparatus, the waste gas 18 sucked into the electron beam irradiation chamber 8 from the waste gas main duct is irradiated with the electron beams 7 from the electron beam accelerator 6, so that oxygen and water in the waste gas are formed into active species such as O and OH radicals. The waste gas having the active species formed therein is supplied to the dispersing device 13 through the pipe line 10 by means of the suction transfer blower 9, and in the dispersing device 13 the waste gas is uniformly dispersed into and mixed with the waste gas 17 within the main duct 12. As a result, the active species such as O and OH radicals act on noxious (gas) ingredients such as $SO_2$ and $NO_x$ in the waste gas 17 to change such noxious (gas) ingredients into the form of mist (sulfuric acid, nitric acid, etc.). If an appropriate amount of ammonia gas is injected from a part (not shown) of the pipe line 10, the mist and the ammonia gas react with each other to form dust (ammonium sulfate, ammonium nitrate, etc.). By capturing the mist and dust by means of a dust collector (not shown) such as an electrostatic precipitator, a bag filter, an active carbon separator, etc., all of which are conventional, it is possible to remove noxious (gas) ingredients such as $SO_2$ and $NO_x$ from the waste gas 17.

Figure 4:
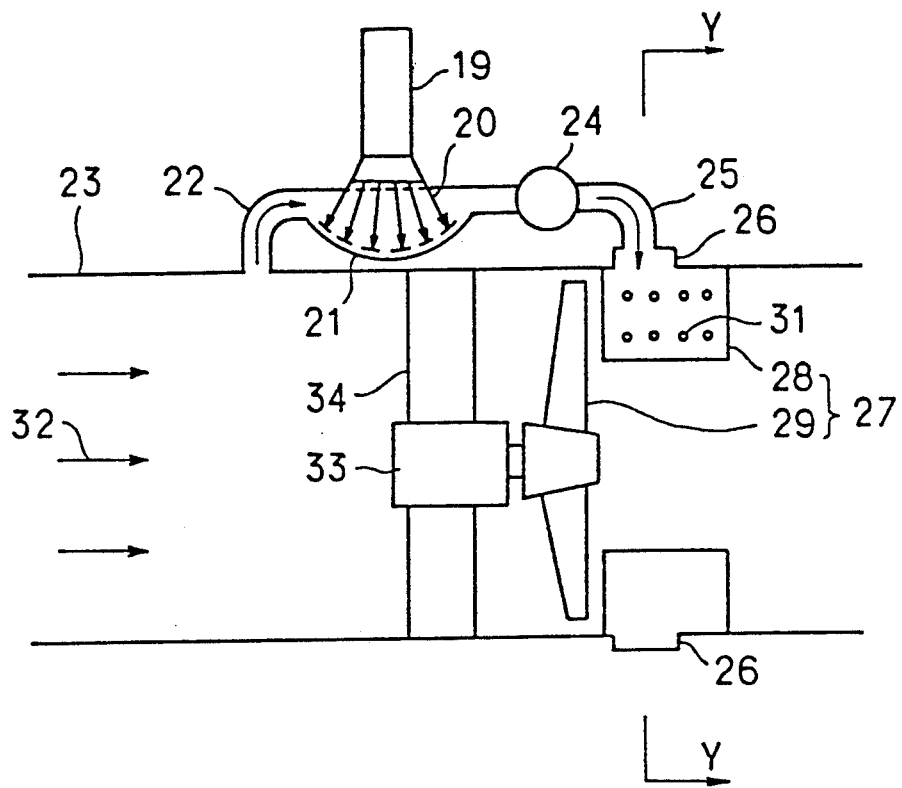
FIG. 4 schematically shows the structure of another waste gas treatment apparatus for carrying out the waste gas treatment method according to the present invention.
Figure 5:
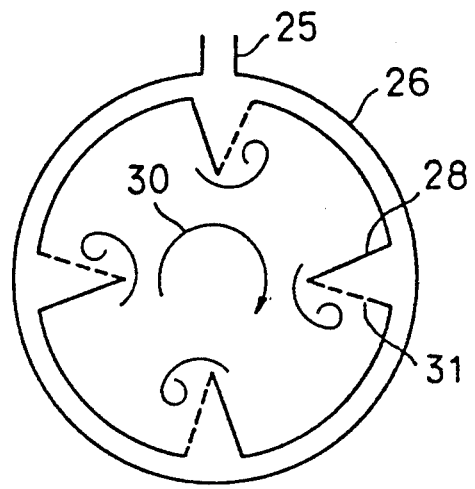
FIG. 5 is a sectional view taken along the line Y—Y of FIG. 4.

FIG. 4 schematically shows the structure of another waste gas treatment apparatus for carrying out the waste gas treatment method according to the present invention, while FIG. 5 is a sectional view taken along the line Y—Y of FIG. 4.

An electron beam irradiation chamber 21 is disposed in the vicinity of a waste gas main duct 23. One end of the electron beam irradiation chamber 21 is communicated with the waste gas main duct 23 through a pipe line 22, while the other end thereof is communicated with a dispersing device 27 through a suction transfer blower 24, as pipe line 25 and an annular passage 26. The electron beam irradiation chamber 21 is provided with an electron beam accelerator 19. The distance from the electron beam irradiation opening of the electron beam accelerator 19 to the wall surface of the electron beam irradiation chamber 21 is set so as to be slightly greater than the maximum range of electron beams 20.

The dispersing device 27 comprises a plurality of fins 28 that communicate with the annular passage 26 and blades 29 which are so disposed as to face the fins 28 and which rotate in the direction of the arrow 30. Each fin 28 has a multiplicity of small bores 31 formed in the reverse side thereof as viewed from the direction of the arrow 30, so that the vortex of waste gas 32 caused by the rotation of the blades 29 allows the waste gas irradiated with electron beams and delivered from the electron beam irradiation chamber 21 to be uniformly dispersed into and mixed with the waste gas 32. It should be noted that, in the figures, the reference numeral 33 denotes a motor for rotating the blades 29, while the numeral 34 denotes a support member for supporting the motor 33 within the waste gas main duct 23.

It should be noted that although in the above-described example the blades 29 are rotated by the motor 33, the arrangement may, of course, be such that the driving section, for example, a motor, for rotating the blades 29 is provided outside the waste gas main duct 23 and the rotational force from the driving section is transmitted by appropriate rotational force transmission menas, for example, gears, chain or belt.

By virtue of the above-described arrangement of the waste gas treatment apparatus, a part of the waste gas sucked in form the waste gas main duct 23 through the pipe line 22 is irradiated with the electron beams 20 from the electron beam accelerator 19, so that oxygen and water in the waste gas are formed into active species such as O and OH radicals in completely the same way as in the above-described example (the example shown in FIG. 2). The waste gas having the active species formed therein is dispersed into and mixed with the waste gas 32 in the waste gas main duct 23 through the dispersing device 27. As a result, the active species act on noxious (gas) ingredients in the waste gas 32 to form mist or dust. Thus it is possible to capture the mist or dust by means of a dust collector such as an electrostatic precipitator, a bag filter, an active carbon separator, etc., all of which are conventional.

It should be noted that the structures of the waste gas treatment apparatus shown in FIGS. 2 to 5 are one embodiment of the present invention and that the present invention is not necessarily limited thereto. In short, each section of the waste gas treatment apparatus may have any specific disposition and structure, provided that the apparatus is arranged such that an electron beam irradiation chamber for irradiation with electron beams from an electron beam accelerator is provided in the vicinity of a main duct for waste gas: a part of the waste gas to be treated is introduced into the electron beam irradiation chamber where waste gas is irradiated with electron beams to thereby form active species such as O and OH radicals; the waste gas having the active species formed therein is fed into the waste gas main duct by means of a feeding device; the waste gas fed into the waste gas main duct is dispersed into and mixed with the waste gas flowing through the main duct by means of a dispersing device, thereby changing noxious (gas) ingredients in the waste gas into the form of a mist or dust by the action of the active species; and the mist or dust is captured by means of a capturing device a duct collector such as an electrostatic precipitator, a bag filter, an active carbon separator, etc., all of which are conventional.

As has been described above, according to the present invention, a part of a waste gas is taken and irradiated with electron beams to form active species in the waste gas to thereby activate it, and the activated waste gas is then mixed with the gas which is object of treatment, thereby changing noxious (gas) ingredients in the waste gas into the form of a mist or dust. Therefore, it is unnecessary to directly irradiate all of the waste gas as in the prior art, and even if the amount of waste gas increases to the extend that would be expected if the treatment is applied on a practical scale and the size of the waste gas duct increases correspondingly, it is unnecessary to dispose a multiplicity of electron beam accelerators and raise the acceleration voltage. Accordingly, it is possible to markedly lower the installation cost of an electron beam accelerator and peripheral devices. For example, in the conventional arrangement wherein electron beams are directly applied to waste gas, it has heretofore been necessary to set the acceleration voltage of the electron beam accelerators at a high level, i.e., 800 kV or 1,000 kV, in order to obtain satisfactory electron beam energy in relation to the waste gas duct size or the like for the purpose of uniformly forming active species in the waste gas, whereas, in the case of the present invention, an electron beam accelerator with an acceleration voltage of about 300 kV suffices and it is therefore possible to markedly lower the installation cost of the electron beam accelerator and peripheral devices.

Further, a method of and apparatus for treating waste gas by irradiation with electron beams according to the subject invention is one wherein the noxious ingredients in the waste gas are changed into the form of a mist or dust by the action of the active species (O and OH radicals, etc.) and the mist or dust is captured by means of a conventional capturing device. Accordingly, this invention differs from the case of using a wet absorption tower as described which requires treatment of the waste water emanating from the absorbing solution used in the wet absorption tower, allowing the costs of installation and maintenance to thus be lowered in this invention.

Furthermore, in the present invention, since a part of the waste gas is taken and irradiated with electron beams, there is no increase in the volume of waste gas even when the waste gas irradiated with electron beams is mixed with the waste gas flowing through the main duct, compared with the case wherein air which is externally taken in is irradiated with electron beams. Thus this invention has no necessity for a large-capacity blower.

INDUSTRIAL APPLICABILITY

Thus, in the method of and apparatus for treating waste gas by irradiation with electron beams according to the present invention, noxious (gas) ingredients such as $SO_2$ and $NO_x$ in waste gas are changed into the form of a mist (sulfuric acid and/or nitric acid) or dust (ammonium sulfate and/or ammonium nitrate) and the resulting mist or dust is then captured with a dust collector or the like. Accordingly, the method and apparatus of the invention are suitable for utilization as a method and apparatus for treating waste gas such as boiler combustion waste gas in thermoelectric powder plants that use fossil fuels, for example, heavy oil or coal, as a fuel or sintering waste gas in iron works.

What is claimed is:

1. A method of treating waste gas flowing in a waste gas main duct, comprising:

diverting a part of said waste gas flowing in said main duct from an outlet of said main duct to an electron beam irradiation chamber exterior to said main duct;

irradiating said part of the waste gas to be treated with electron beams in said irradiation chamber exterior to said waste gas main duct to form active species in the irradiated waste gas;

introducing into said waste gas main duct downstream of said outlet the waste gas having said active species formed therein and mixing the introduced waste gas having said active species formed therein with said waste gas to be treated, thereby changing noxious (gas) ingredients in said waste gas to be treated into the form of a mist or dust by the action of said active species; and capturing said mist or dust.

2. An apparatus for treating waste gas flowing in a waste gas main duct, comprising:

an electron beam irradiation chamber located exterior to said waste gas main duct for irradiation of any waste gas within said chamber with electron beams from an electron beam accelerator;

a feeding device having an inlet coupled to an outlet of said main duct and which introduces a part of waste gas to be treated into said electron beam irradiation chamber where said part of said waste gas is irradiated with electron beams thereby to form active species and which feeds the waste gas having said active species formed therein to an inlet of said main duct downstream of said outlet of said main duct;

a dispersing device disposed in said main duct and coupled to said inlet of said main duct for uniformly dispersing in the main duct downstream of said outlet the waste gas having said active species fed from said feeding device; and a capturing device for capturing noxious (gas) ingredients in the waste gas within the main duct which have been changed into the form of a mist or dust by the action of said active species.

* * * * *